United States Patent [19]
Ottestad et al.

[11] Patent Number: 5,918,639
[45] Date of Patent: Jul. 6, 1999

[54] DEVICE FOR REPAIRING DAMAGE OR PROVIDING BRANCHINGS ON EXISTING PIPE INSTALLATIONS

[75] Inventors: Nils T. Ottestad, Tønsberg; Hans Knutsen, Akrehavn, both of Norway

[73] Assignee: Power Diaphragm Technology A/S, Sandsli, Norway

[21] Appl. No.: 08/633,789

[22] PCT Filed: Oct. 19, 1994

[86] PCT No.: PCT/NO94/00169

§ 371 Date: Jun. 24, 1996

§ 102(e) Date: Jun. 24, 1996

[87] PCT Pub. No.: WO95/11397

PCT Pub. Date: Apr. 27, 1995

[30] Foreign Application Priority Data

Oct. 19, 1993 [NO] Norway ................................. 933753

[51] Int. Cl.⁶ .................................................. F16L 55/16
[52] U.S. Cl. ........................... 138/99; 138/158; 138/157; 264/36
[58] Field of Search ..................... 138/99, 97, 156–158, 138/161, 167; 264/36

[56] References Cited

U.S. PATENT DOCUMENTS 3,480,043  11/1969  Proudfoot et al. ....................... 138/99
3,496,963  2/1970  Bardgette et al. ....................... 138/99

FOREIGN PATENT DOCUMENTS

| 689 784 | 3/1940 | Germany. |
| 1 207 590 | 10/1970 | United Kingdom. |
| 1 440 255 | 6/1976 | United Kingdom. |
| 1 522 165 | 8/1978 | United Kingdom. |
| 2 018 379 | 10/1979 | United Kingdom. |

*Primary Examiner*—Patrick Brinson
*Attorney, Agent, or Firm*—Marshall, O'Toole, Gerstein, Murray & Borun

[57] ABSTRACT

A device for repairing damages or providing branchings on pipes, especially in existing underwater pipe installations, comprises a cylindrical, longitudinally divided muff (1) which is dimensioned to be placed around and clamped to the topical pipe (4) by a clamping means (6), a sealing means (18) being provided between the muff (1) and the surface of the pipe (4). At least one of the muff members (2, 3) is composed of a strong outer layer (10) and a less strong inner layer (11) which layers are joined so as to form an intermediate closed volume (14 and 15), said muff member (2 or 3) being provided with a means (17) for supplying a hydraulic pressure medium (19) to said volume, so that the volume when pressurized expands and the inner layer (11) and the sealing means (18) thereby are pressed to seating engagement with the adjacent surface of the pipe (4).

7 Claims, 4 Drawing Sheets

DEVICE FOR REPAIRING DAMAGE OR PROVIDING BRANCHINGS ON EXISTING PIPE INSTALLATIONS

The invention relates to a device for repairing damages or providing branchings on pipes, especially in existing underwater pipes installations, comprising a cylindrical metal muff which is longitudinally divided to form a pair of metal muff members which are dimensioned to be placed around and clamped to the topical pipe by a clamping means, a sealing means being provided between the muff and the surface of the pipe.

Repair of damages on existing underwater pipe installations, for example in the offshore industry, may become very expensive. At larger depths welding is of little current interest since one can not use divers for making good possible faults arising when using automatic welding machines. Today, if a deep-water pipe installation is subjected to crack formation or other minor damages, one will have to remove parts of the pipe and install a jointing means. Known jointing means are complicated, time-consuming and expensive to have installed.

Further, within the offshore industry, there is an expressed wish to be able to make branchings on existing pipe installations without having to interrupt the operation ("hot tapping"). Secondarily, it is wanted that such operations be executed with the shortest possible operational loss on the pipes.

It is an object of the invention to provide a device enabling substantial savings in case of repairs of damages on existing underwater pipe systems, in that damages can be repaired without replacing parts of the pipe system.

Another object of the invention is to provide such a device which also enables a quick and cost-efficient provision of branchings on existing pipe installations without interruption of the operation, and without weakening the pipe installation.

For the achievement of the above-mentioned objects there is provided a device of the introductorily stated type which, according to the invention, is characterized in that at least one of the muff members is composed of a strong outer layer and a less strong inner layer which are joined so as to form an intermediate closed volume, said muff member being provided with a means for supplying a hydraulic pressure medium to said volume, so that the volume when pressurized expands by movement of the inner layer, and the inner layer and the sealing means thereby are pressed to sealing engagement with the adjacent surface of the pipe.

In the device according to the invention, said at least one muff member with its outer and inner layers consists of metal, and the sealing device consists of metal ribs projecting from and forming closed loops on the surface of the inner layer, for the provision of a metal-to-metal seal between the muff member and the topical pipe.

The device according to the invention when used as a pipe repairing system, may give substantial savings, one being able to repair damages without replacing parts of the pipe system. Further, one may make branchings on existing pipe installations without having to interrupt the operation (hot tapping), and without weakening the pipe installation. In offshore applications one can, as compared to existing alternatives, nearly irrespective of water depth carry out hot tapping very quickly and cost-efficiently by using a remotely operated vehicle (ROV) for carrying out the branching operation.

When the hydraulic pressure medium is pressed in between the outer and inner layer of the muff members when the device is assembled on a pipe, there is established a strong pressure pressing the outer layer radially outwards and the inner layer inwards against the pipe. The hydraulic sealing pressure preferably may be permanently maintained in that a hardening liquid is used as the hydraulic pressure medium.

The sealing action is enhanced in that the inner layer 30 is provided with outwardly projecting, seal-forming ribs, as mentioned above. The pressurization of the hydraulic pressure medium thereby will entail that the material of the ribs reaches the yield point and "melts" together with the surface of the pipe already at a moderate pressure, so that a gas-tight metal-to-metal contact is obtained.

A substantial advantage of the present device is that one can obtain a significant reinforcement of the pipe installation where the muff is mounted, mechanical stresses being "absorbed" by the strong outer layer of the muff. Another important property of the device is that the sealing forces increase with the internal pressure of the pipe, since a high pressure will seek to expand the pipe which is thereby pressed even harder against the inner layer of the muff.

The invention will be further described below in connection with exemplary embodiments with reference to the drawings, wherein FIG. 1 shows a cross-section of an embodiment of a branching muff according to the invention, wherein the components are shown separated from each other;

In the embodiments in FIGS. 1–5 corresponding members are designated by the same reference numerals.

Figure 1:
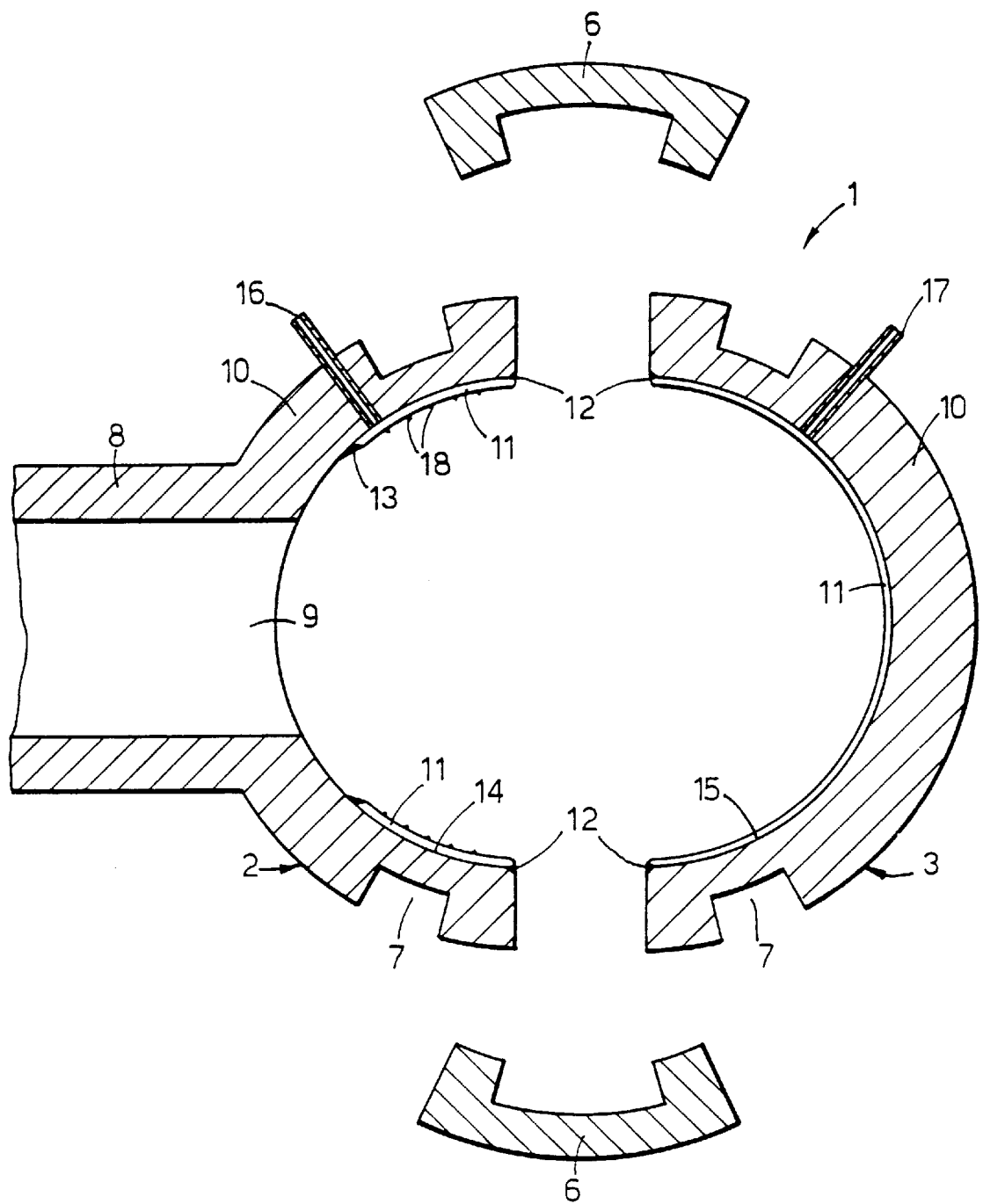
Figure 2:
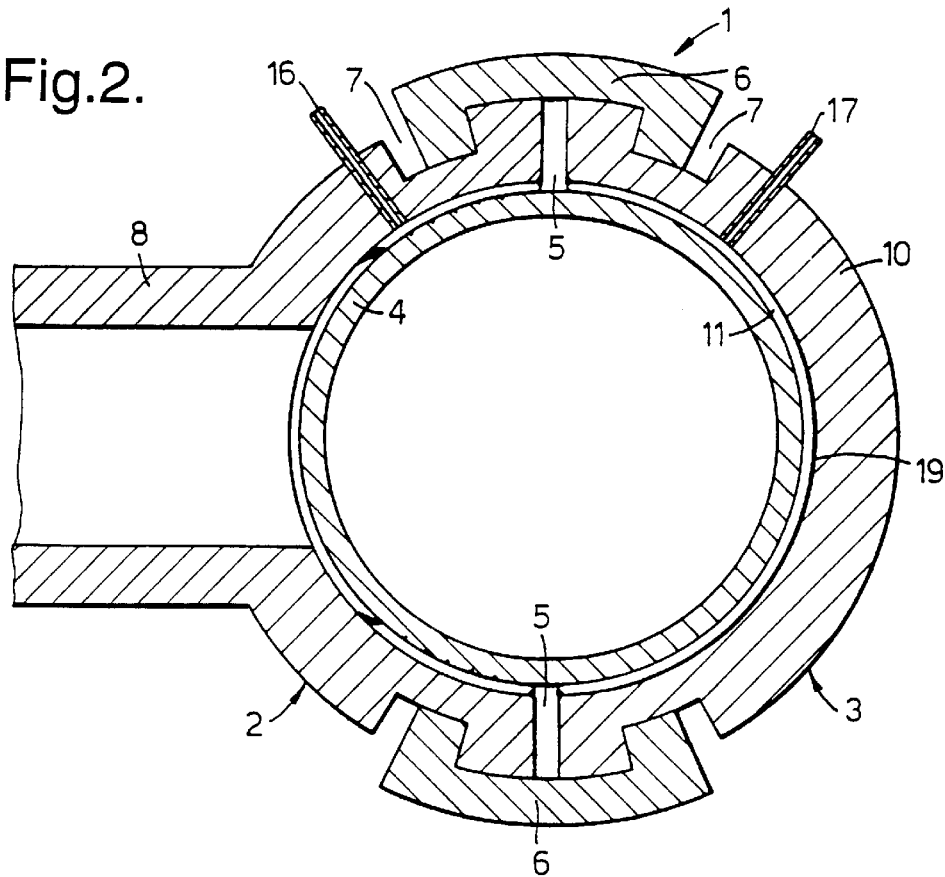
FIG. 2 shows a cross-section of the branching muff in FIG. 1 in assembled condition.

The embodiment shown in FIGS. 1–2 comprises an essentially cylindrical muff or sleeve 1 which is divided in the longitudinal direction for the formation of two halves 2 and 3 which are dimensioned to be placed around and clamped to the outer surface of a pipe 4, the inner surface of the halves having a curvature essentially corresponding to the curvature of the outer surface of the pipe. Such as appears from FIG. 2, an interspace or gap 5 is left between the adjacent side edges of the halves 2, 3 when these are placed in their mounting position on the pipe 4, to achieve a certain dimensional tolerance and to facilitate the assembly and clamping of the muff or sleeve members on the topical pipe. In the illustrated embodiment, the muff members are clamped by means of a pair of schematically shown locking clamps 6 which are adapted to engage in longitudinal grooves 7 at the side edges of the muff members. However, it is clear that many different shapes of clamping devices may be used, for example as shown in the embodiment in FIGS. 6 and 7.

The illustrated embodiment of the device is constructed for providing a leakage-proof branching on a pipe, and for this purpose one muff half 2 is provided with a pipe socket 8 projecting from an opening 9 in the muff member, a sealing means being arranged around the opening, such as described below.

As it appears, each of the muff members consists of a relatively thick and strong outer layer 10 and a relatively thin and less strong, inner layer 11, the two layers being joined— e.g. by welding—along outer limiting edges of the inner layer, in the illustrated case along the end edges (not shown) of the layers 10, 11 and along their side edges 12, and further along a limiting edge 13 of the inner layer 11 around the opening 9 for the pipe socket 8. Thus, between the inner and outer layers of the muff halves there are formed respective closed volumes 14 and whereby these volumes admittedly has a minimal radial extension, the adjoining surfaces of the inner and outer layers 10, 11 as shown being closely adjacent to each other. Each of the muff members is provided with a short tube length 16 and 17, respectively, extending through the outer layer 10 into the closed volume 14 and 15, respectively, for the supply of a suitable hydraulic pressure medium for expansion of said volume, such as described below.

At the inner surface of the inner layer 11 of the muff member 2 containing the pipe socket 8, there is arranged a sealing means which, in the illustrated embodiment, consists of ribs 18 projecting from the surface and forming closed loops around the joining edge 13, and accordingly also around the pipe socket opening 9. The outer and inner layers of the muff member and the sealing ribs 18 preferably consist of a metal, such that an efficient metal-to-metal seal is formed between the muff member and the topical pipe, when also the pipe is of metal.

Such as will be clear, both muff members 2, 3 may be provided with a branching pipe socket, if desired. When only one muff member has a pipe socket, as in the illustrated embodiment, the other muff member normally will be without any seal-forming ribs (or a possible other sealing means).

Even if the sealing means in the illustrated embodiment consists of loop-forming ribs formed integrally with the inner layer of the muff members, it will be clear that, instead, there may be arranged a separate sealing means, for example a suitable gasket or packing means.

When installing the shown device, the two muff halves 2, 3 are placed around the pipe 4 whereafter the locking clamps 6 are fastened. Thereafter hydraulic pressure medium 19 is pressed into the closed volume 15 through the tube 17, so that the outer layer 10 with expansion of the volume 15 is pressed radially outwards, and the inner layer 11 is pressed inwards against the pipe 4. The tube 17 is shut off when the desired "locking pressure" is established. The locking pressure, which may be of the order of 200 bars, causes a high tractive force in the sleeve member 2 to the left in the Figures, which member is thereby pulled tightly against the surface of the pipe 4. Thereafter sealing is secured in the contact surfaces between the ribs 18 and the pipe 4 by pressing pressure medium into the volume 14 through the tube 16 which is shut of f when the desired locking pressure is obtained. In this situation the ribs 18 will represent closed loops of which each forms a barrier which prevents leakage after an aperture has been formed in the pipe 4 for communication with the pipe socket 8.

As mentioned in the introduction, the pressure medium preferably is a hardening material, e.g. a liquid resin, for maintaining a permanent sealing pressure after injection of the material.

The branching pipe 8 in its extension advantageously may be provided with a pair of ball valves in series (not shown), to enable locking-in and locking-out of a suitable hydraulic tool which may be used to form an aperture into pipe systems which is wholly or partly in operation (so-called hot tapping).

As appears, the joining edge 13 represents a considerably larger opening than the pipe socket opening 9. This is due to the fact that one does not want the strong sealing pressure to influence the pipe 4 in the region closely adjacent to the opening 9.

Figure 3:
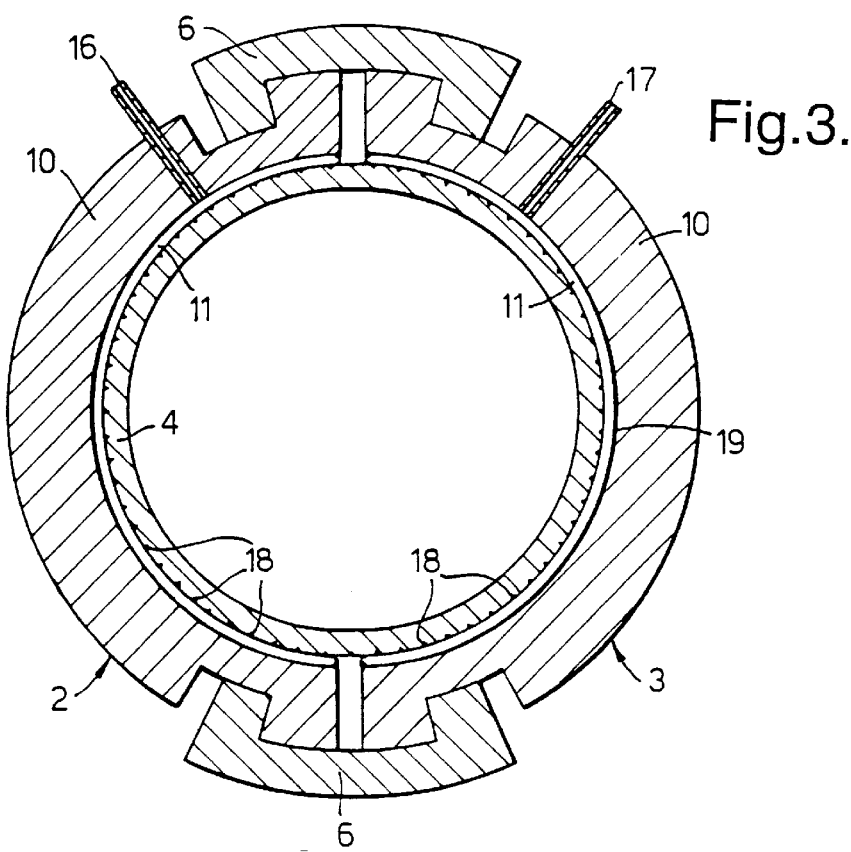
FIG. 3 shows a cross-section of a ready assembled and pressurized repair muff.

FIG. 3 shows an embodiment of a ready mounted device according to the invention for repair and mending of damages on existing pipes. This embodiment corresponds to the embodiment in FIGS. 1–2, except for the fact 1) that there is not provided any branching pipe socket, and 2) that both of the inner layers 11 of the muff halves 2, 3 are provided with a sealing means in the form of ribs 18 forming closed loops on the inner surfaces of the layers. This means may be used to seal leakages as a consequence of e.g. crack formations in the topical pipe, provided that the damage is located within one or more liquid barriers (closed ribs). Simultaneously, the means will reinforce the pipe and counteract a further development of the damage.

The sealing means of the device is activated in the same manner as in the device according to FIGS. 1 and 2, except for the fact that both sleeve halves 2, 3 now are to be pressurized simultaneously.

In the embodiment according to FIG. 3, one will not be able to establish a seal in the interspace area under the locking clamps 6. However, for the provision of a seal approximately around the entire circumference of the repair muff, there may be arranged a separate inner sealing sleeve, for example as shown of FIG. 4 where the sealing sleeve is designated by 20. In relation to the embodiment in FIG. 3, the inner radius of the repair muff is here increased with the thickness of the sealing sleeve.

Figure 4:
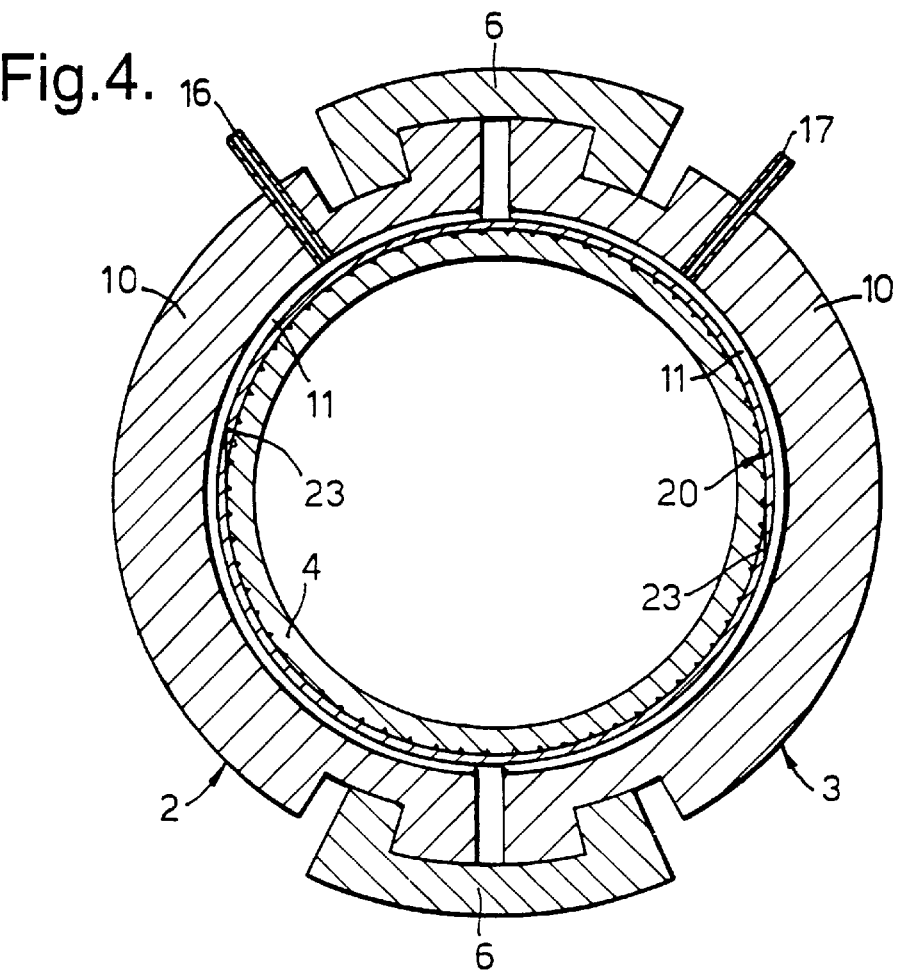
FIG. 4 shows a cross-section of a repair muff which is provided with a separate, divided sealing sleeve.
Figure 5:
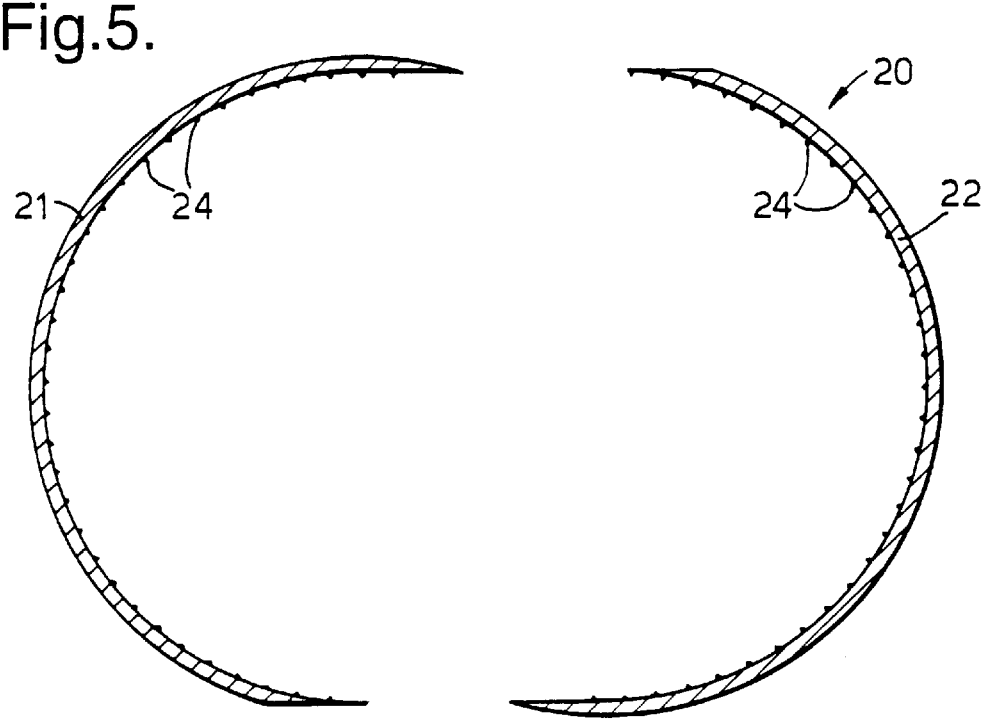
FIG. 5 shows a cross-section of the sealing sleeve in FIG. 4.

As shown in FIG. 5, the sealing sleeve 20 consists of a pair of cylindrical halves 21, 22 having generally semicircular cross-sectional shape, wherein the halves overlap each other in the joint regions 23, as shown in FIG. 4. The inner diameter of the composite sealing sleeve 20 corresponds to the outer diameter of the topical pipe. Both halves internally are provided with closed rib patterns 24 wherein the longest rib loops follow the outer edge of each of the sealing sleeve halves. To ensure an optimum sealing action, the orientation of the sealing sleeve relative to the muff halves 2, 3 should be as shown in FIG. 4. In other respects the need for sealing ribs in the repair muff itself is reduced with the use of such a sealing sleeve.

Figure 6:
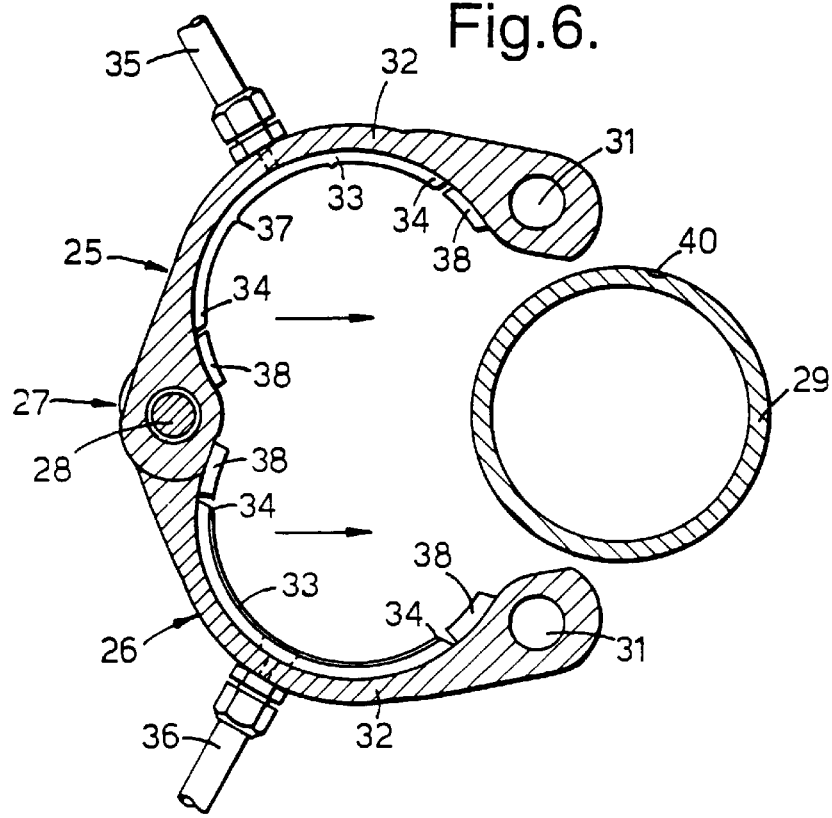
FIGS. 6 and 7 show cross-sections of another embodiment of a repair muff according to the invention, in open condition and closed condition, respectively, clamped on a pipe.
Figure 7:
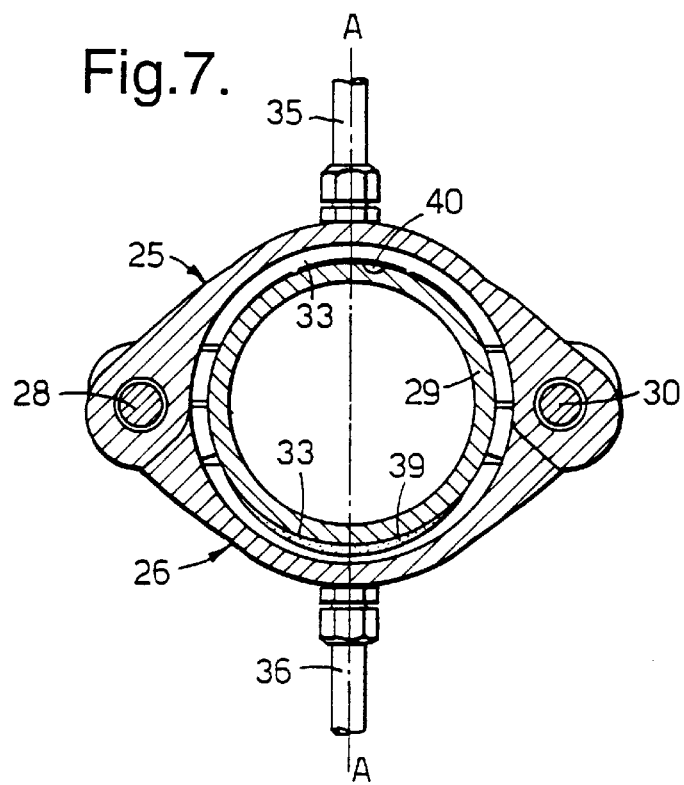

Another embodiment of the repair muff according to the invention is shown in FIGS. 6 and 7. The main difference in relation to the embodiment in FIG. 3 is that the muff halves 25, 26 here are not separate members, but are permanently connected in a rotating connection 27. More specifically, the muff halves at adjacent longitudinal edges are hinged to each other by means of an axle or hinge bolt 28, whereas the members, at the opposite longitudinal edges, are provided with a means for releasable clamping of the muff members around the topical pipe 29. The clamping means is shown to consist of a locking bolt 30 which is adapted to be introduced in mating holes 31 at the free ends of the muff halves.

In other respects, the construction in principle corresponds to the aforementioned embodiment according to FIG. 3, each of the muff halves 25, 26 consisting of an outer strong layer 32 and an inner less strong layer 33, wherein the layers are joined to each other along outer limiting edges 34 of the inner layer, for defining closed volumes between the adjacent surfaces of the layers. For the supply of pressure medium to respective ones of these volumes, there are arranged supply tubes 35 and 36, respectively.

In the illustrated embodiment, only one muff half 25 is provided with loop-forming sealing ribs 37 on the inner surface of the inner layer 33. Further, supporting blocks 38 are shown to be fixed to the inner side of each of the outer layers 32 outside of the limiting edges 34, for abutment against the surface of the topical pipe 29 in the diametrically opposite regions wherein the muff members are attached to each other in installed position on the pipe.

As appears from the Figures, the inner layer 33 on the muff member 25 is shown to be substantially thicker than the inner layer 33 on the muff member 26. This is due to the fact that the first-mentioned layer is provided with sealing ribs 37 and then must be sufficiently thick to transfer the sealing force to the sealing ribs without yielding, whereas the other inner layer in the illustrated embodiment is without sealing ribs, and then may be relatively thin, for efficient transfer of the sealing pressure from the pressure medium 39.

When mounting the device, the muff half 25 is placed on the topical pipe 29 so that the pattern of ribs 37 covers the damage 40 on the pipe. Thereafter the other muff half 26 is pivoted about the hinge bolt 28, and the clamping means is locked in that the bolt 30 is moved in place. The device, which is symmetric about the line A—A in FIG. 7, is pressurized through the supply tubes 35, 36. Whether both, or only one supply line is to be pressurized, will depend on pipe dimension, type of damage, etc. The essential thing is that one achieves a satisfactory pressure with the entire contact surface between ribs and pipe.

The advantages of this embodiment in relation to the embodiment according to FIG. 3, is that the device is simpler to position on the topical pipe, and that an equally large strength is achieved with a smaller total weight of the repair device.

We claim:

1. A device for repairing damage or providing branchings on a pipe, especially in existing underwater pipe installations, comprising a cylindrical metal muff which is longitudinally divided to form a pair of metal muff members which are dimensioned to be placed around and clamped to the pipe by clamping means, and sealing means provided between the muff and the surface of the pipe, wherein at least one of the muff members comprises a strong outer metal layer and a less strong inner metal layer, which layers are joined so as to form an intermediate closed volume between said strong outer metal layer and said less strong inner metal layer, said muff member being provided with means for supplying a hydraulic pressure medium to said volume, so that the volume when pressurized expands by movement of the inner layer, and the inner layer and the sealing means thereby are pressed to sealing engagement with the adjacent surface of the pipe.

2. A device according to claim 1, wherein the muff comprises two halves which are permanently hinged to each other at adjacent longitudinal edges, and which at opposite longitudinal edges are provided with means for releasably clamping the muff members around the pipe.

3. A device according to claim 2, comprising a separate, longitudinally divided sealing sleeve which is dimensioned for placement between the inner layers of the muff members and the pipe, the sealing means being disposed on the inner surface of the sealing sleeve.

4. A device according to claim 1, wherein the sealing means comprises ribs projecting from and forming closed loops on the surface of the inner layer.

5. A device according to claim 1, for providing a leakage-proof branching on a pipe, wherein one muff member is provided with a pipe socket projecting outwardly from an opening in the muff member, said sealing means being disposed around the opening.

6. A device according to claim 5, wherein the sealing means comprises metal ribs forming closed seal-forming loops around the opening.

7. A device according to claim 1, wherein the hydraulic pressure medium is a hardenable liquid.

* * * * *